Aug. 13, 1935.     H. W. LORD      2,011,366
TIME INDICATOR
Filed Aug. 26, 1933     4 Sheets-Sheet 2

Inventor:
Harold W. Lord,
by Harry E. Dunham
His Attorney.

Aug. 13, 1935.    H. W. LORD    2,011,366
TIME INDICATOR
Filed Aug. 26, 1933    4 Sheets-Sheet 3
Fig. 5.
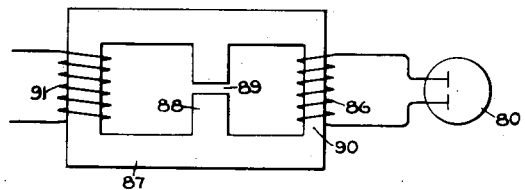
Fig. 6.
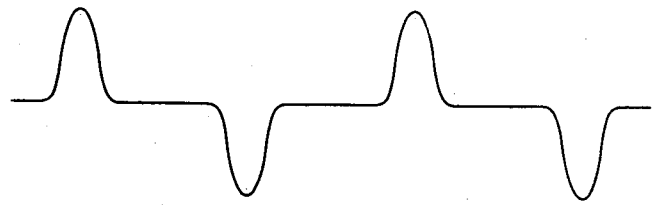
Fig. 7.    Fig. 8.
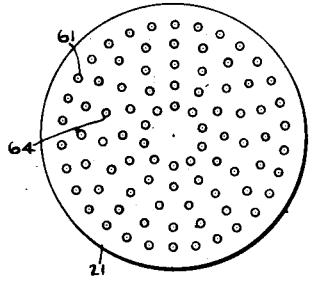 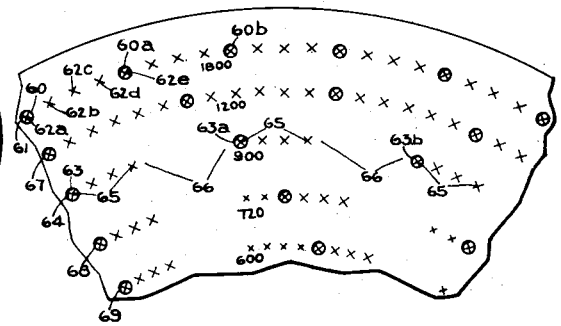
Inventor:
Harold W. Lord,
by Harry E. Dunham
His Attorney.

Aug. 13, 1935.  H. W. LORD  2,011,366
TIME INDICATOR
Filed Aug. 26, 1933  4 Sheets-Sheet 4

Inventor:
Harold W. Lord,
by Harry E. Dunham
His Attorney.

Patented Aug. 13, 1935

2,011,366

UNITED STATES PATENT OFFICE 2,011,366

TIME INDICATOR

Harold W. Lord, Schenectady, N. Y., assignor to General Electric Company, a corporation of New York Application August 26, 1933, Serial No. 686,974

9 Claims. (Cl. 177—311)

My invention relates to time indicating devices and concerns particularly arrangements for indicating the time duration of regularly recurring operations or events.

Although my invention is generally applicable to the indication of time duration of various operations and events, it will be described in connection with a resistance welding system with which it is particularly useful.

In resistance welding systems of certain types, the current is applied intermittently, and in such apparatus it becomes desirable to provide means for readily determining the length of time the current is flowing and the length of time no current is flowing. Such a device becomes particularly desirable in connection with alternating current resistance welders controlled by vapor discharge tubes having control elements. I have found that the character of the weld obtained depends upon the exact number of half cycles that welding current is flowing and is not flowing and upon the rate at which the welding current is interrupted. In order to reproduce work and in order to produce welds of the same character on a plurality of welding machines, it is advantageous to be able to set the welding machine in advance without experimenting on the work before finding the proper setting.

It is an object of my invention to provide a device for indicating visually the lengths of time the current is flowing and the current is interrupted in a resistance welder controlled by vapor discharge tubes. It is a further object of my invention to provide means for indicating the length of time current is flowing in any electrical circuit which is alternately energized and unenergized.

It is still another object of my invention to provide a device for indicating generally the time duration of operations occurring intermittently at regular intervals.

Other and further objects and advantages of my invention will become apparent as the description proceeds.

In accordance with my invention, in its preferred form, I provide a rotating disk with uniformly spaced holes therein and a stroboscopic lamp associated with the welding circuit of an alternating current welding system, the light from the lamp being viewed through the holes in said rotating disk. The rotation of the disk causes the light to appear as series of bright spots representing the conducting periods alternating with dark spaces representing the periods when the welding circuit is not energized. The number of light spots in each series provides an indication of the number of half cycles during which the welding circuit was energized, and the spacing of the groups of light spots provides an indication of the rate at which the welding current is being interrupted.

The features of my invention which I believe to be novel and patentable are pointed out in the claims appended hereto. A better understanding of my invention itself, however, may be obtained by referring to the following description in connection with the accompanying drawings.

Fig. 5 represents a modified arrangement for causing a separate lamp to become luminous for only very short periods of time.

Fig. 6 is a voltage curve explaining the operation of the apparatus in Fig. 5.

Fig. 7 is a diagram illustrating the arrangement of apertures in the rotating disk employed in my apparatus for obtaining indications of time duration for any of a plurality of different numbers of current interruptions per minute.

Fig. 8 is a diagram corresponding to a portion of the rotating disk of Fig. 7 representing the appearance of the light spots in determining time duration for a particular adjustment of the apparatus.

Figure 1:
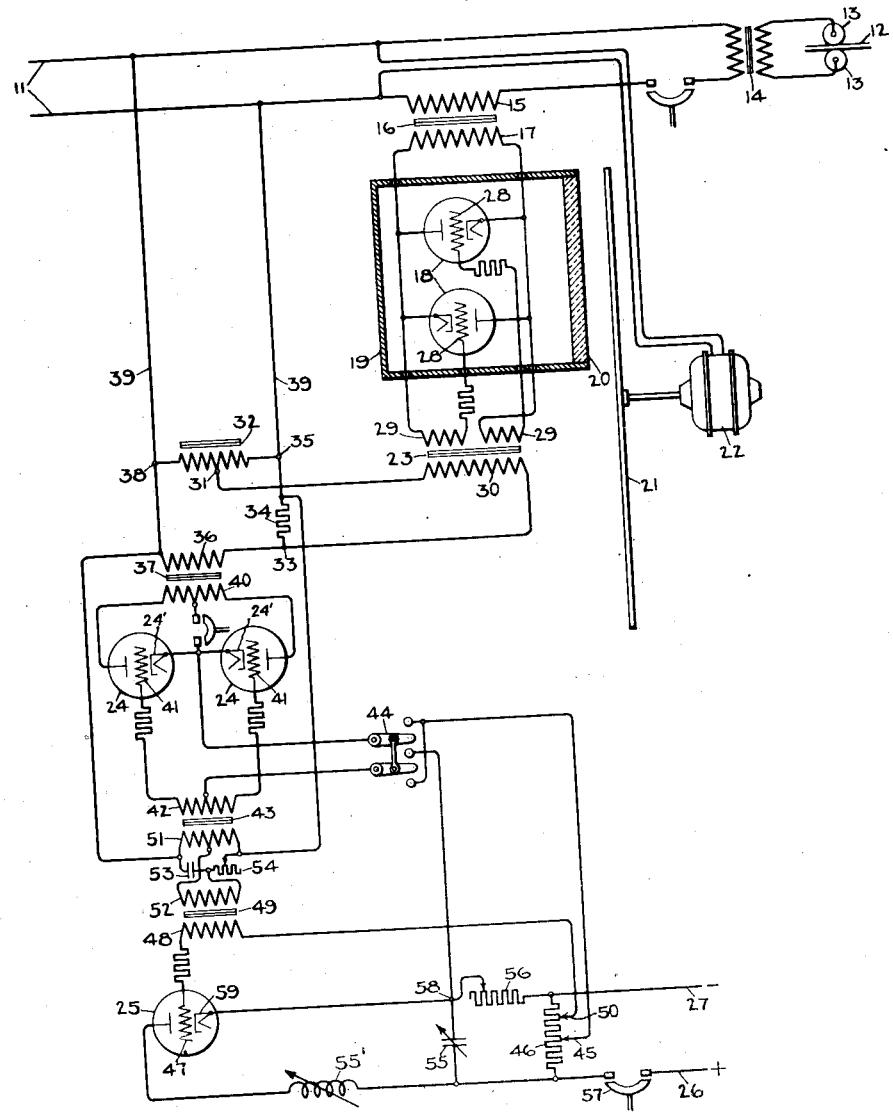
Fig. 1 is a circuit diagram illustrating schematically an embodiment of my invention in connection with an alternating current welding system controlled by grid controlled vapor discharge tubes, and in which light flashes are furnished by one or more of the grid controlled discharge tubes.

Referring now more in detail to the drawings in which like reference characters are used to designate like parts throughout, for the sake of illustration, I have shown apparatus embodying my invention used in connection with a welding system, the latter being similar to that disclosed in my copending application, Serial No. 585,292, filed January 7, 1932, and assigned to the same assignee as the present application.

The necessary electrical energy is supplied by a source of alternating current connected at 11 and the work to be welded is represented at 12 between a pair of welding electrode rolls 13. Welding current is supplied by a transformer 14 connected to the alternating current source 11 in series with primary winding 15 of a control transformer 16 having a secondary winding 17 which may be short circuited by means of grid controlled vapor discharge tubes 18 for the purpose of diminishing the reactance of series transformer 16 and permitting welding current to flow.

The discharge tubes 18 may, if desired, be enclosed in a light-tight box 19 having a ground glass front 20 which may be viewed through a disk 21 having a plurality of apertures therein evenly spaced on concentric circles as shown in Fig. 7. The disk 21 is driven at a uniform rate of speed by means of a synchronous motor 22 connected to the source of alternating current 11 in advance of the control transformer 16 so as to be unaffected by interruption of energization of the welding circuit. It will be understood, of course, that the flashes of light from tubes 18 may also be viewed directly through the apertures of disk 21 without the interposition of the screen 20 and that the light-tight box 19 need not necessarily be used.

As will be explained more fully hereinafter, the discharge tubes 18 which control the welding current are themselves controlled through the agency of a grid transformer 23 by discharge tubes 24. Discharge tubes 24 in turn are controlled by grid voltages obtained from an inverter circuit which includes a discharge tube 25 and is energized by a direct current source 26—27.

The discharge tubes 18 are provided with control grids 28 connected to secondary windings 29 of the transformer 23. The transformer 23 is provided with a primary winding 30 connected between the mid-tap 31 of a reactor 32 and a point 33 connected through a resistor 34 to the terminal 35 of reactor 32 and through a primary winding 36 of a transformer 37 to a terminal 38 of the reactor 32. The terminals 35 and 38 of reactor 32 are connected through conductors 39 to the alternating current source 11, so that by causing the impedance of winding 36 to be materially greater or less than the impedance of resistor 34, thus in effect, connecting point 33 to either terminal 35 or 38, the voltages impressed on transformer 23 and on control grids 28 of tubes 18 may be caused to be either substantially 180° out of phase or substantially in phase with the voltage impressed on tubes 18 by series transformer 16, and the tubes 18 may be made either non-conducting or conducting.

The discharge tubes 24 are connected across a secondary winding 40 of the transformer 37 and are provided with control grids 41 which are connected through a secondary winding 42 of a transformer 43 and a switch 44, which is maintained in the down position for the type of operation herein described, to a tap 45 of a potentiometer 46 which may, if desired, be connected to the direct current source 26—27. The discharge tubes 24 regulate the impedance of the transformer 37 so that the impedance of its winding 36 may be made greater or less than that of the resistor 34.

The inverter circuit including the tube 25 is a modified form of the circuit shown in U. S. Patent 1,859,082 to Alan S. Fitz Gerald and Harry L. Palmer, granted May 17, 1932, and assigned to the same assignee as the present application. The discharge tube 25 is provided with a control grid 47 connected through a winding 48 of a transformer 49 to a tap 50 of the potentiometer 46. The windings 51 of transformer 43, and 52 of transformer 49, are connected by an adjustable phase shifting arrangement comprising a condenser 53 and a rheostat 54. The transformers 43 and 49 serve to improve the operation of the welding system as explained in my copending application, above mentioned, but their method of operation is not essential to an understanding of the present invention. The inverter circuit also includes a condenser 55 arranged to be charged by the source 26—27 through an impedance 56, here shown as a resistor, and arranged to be discharged through the tube 25 and a reactor 55'. In order to regulate the rate of charge and discharge of the condenser 55 either or both the condenser 55 and the resistor 56 are made variable.

The operation of the welding system is as follows:

When the circuit from the source 26—27 to the condenser 55 is closed through a switch 57, the point 58 is at the positive potential of the terminal 26 of the direct current source and the full voltage of the direct current source 26—27 occurs as a potential drop in the resistor 56. Since, when the switch 57 is first closed, there is no difference in potential between the plates of condenser 55, the grid 47 of the discharge tube 25, being connected to the tap 50 of potentiometer 46, will be at a negative potential with respect to the cathode 59 of the discharge tube 25 causing the discharge tube to remain non-conducting. As the current continues to flow into condenser 55 however, its voltage gradually increases and the potential of the point 58 becomes more negative until grid 47 of the discharge tube 25 is rendered positive with respect to the point 58 and the cathode 59, thereby permitting the discharge tube 25 to become conducting and to discharge the condenser 55 through the circuit including reactor 55'. As a result of the reactance of the reactor 55' or the inherent reactance of the circuit, the potential difference between the plates of the condenser 55 tends to reverse and the flow of current through the discharge tube 25 is extinguished. The operation is then repeated and a charge again builds up on condenser 55. The rate at which the condenser 55 is charged and discharged determines the rate at which the welding current between electrodes 13 is interrupted, as will become apparent.

When the condenser is discharged, the point 58 connected to cathodes 24' of discharge tube 24 is positive with respect to the tap 45 connected to grids 41 of the discharge tubes 24 and the tubes 24 remain non-conducting. Then each time as the charge builds up and exceeds a value determined by the constants and the adjustment of the apparatus, the point 58 becomes negative with respect to the tap 45 so that the cathodes 24' become negative with respect to the grids 41 of the tubes 24 rendering them conducting. Whenever the discharge tubes 24 become conducting they short circuit the winding 40 of the transformer 37 causing the reactance of the winding 36 to fall to a minimum thereby in effect transferring the connection 33 of winding 30 of transformer 23 to the terminal 38 of the reactor 32. The phase relationship of the grids 28 of the discharge tubes 18 is thereby varied substantially 180° so as to cause the discharge tubes 18 to become conducting and short circuit the series transformer 16 permitting a welding current to flow between the welding electrodes 13. The duration of the welding current is controlled by the adjustment of the rate of charge and discharge of the condenser 55 of the inverter circuit so that within the range of the apparatus any desired number of interruptions of the welding current may be obtained per minute and the welding current may be caused to continue for any desired number of half-cycles of the alternating current wave. As explained in my copending application mentioned above, the welding current is always caused to flow for a whole number of half-cycles and does not continue for a fraction of a cycle.

The manner in which the apparatus provides an indication of the duration of the welding current will become apparent from a consideration of the effect of observing the translucent screen 20 through a revolving disk having a single aperture. It is assumed that the alternating current source 11 operates at 60 cycles. There are, therefore, 120 half-cycles per second and consequently, if the system is continuously energized, owing to the inherent property of the discharge tubes 18 of producing light flashes when energized, 120 flashes per second will be observed through an aperture in the disk 21. It will be assumed that the disk 21 is rotating at a speed of 60 revolutions per minute or 1 revolution per second. Consequently, the single aperture through which the light is being viewed, for example, the aperture 60 (Fig. 8), will be observed in 120 different positions in one second, and owing to the persistence of vision, the revolving aperture 60 will tend to appear as an arc of a complete circle of 120 evenly spaced spots of light. The persistence of vision, however, would ordinarily not be great enough to cause the simultaneous appearance of the entire circle of 120 light spots. The spots of light would fade a fraction of a second after the aperture had passed the location of the spots so that groups of light spots would become visible at different portions of the periphery of the circle as the aperture traveled around the circle.

In the particular arrangement described, the spots of light will be 3 angular degrees apart. In order to increase the intensity of the spots of light and in order to insure the continuous appearance to the eye of a complete circle of light spots, instead of merely a traveling arc, a plurality of apertures spaced around the circle is preferable. If the angular spacing between the apertures 60, 60a, 60b, 60c, etc., is made 3 degrees or a multiple of 3 degrees, the visual effect of the light flashes seen through any one of the apertures will be superimposed on the effect produced by any of the other apertures. By a method which will be explained hereinafter, the speed of the disk and the spacing of the apertures are so chosen in relation to the frequency of the alternating current source that each of the apertures will pass a given point at an instant that a light flash occurs. The arrangement of the light spots when the alternating current is flowing without interruption is illustrated in row 61 of Fig. 8 representing one-sixth of the disk 21. The points 62a, 62b, 62c, 62d, 62e, etc., represent light spots as they appear to the eye. The circles 60, 60a, 60b, 60c, etc., represent the actual apertures. However, it will be understood that the positions of the apertures are shown differently from the other positions of the light spots merely to indicate the positions of the apertures at a given instant for purposes of explanation and that the appearance of all the light spots is the same. It will also be understood that for the sake of clearness in the drawings, the apertures in Fig. 7 are shown as relatively larger than the size actually employed and that in fact the apertures are of such a size that their images will appear as distinct spots of light as indicated in Fig. 8.

Since each of the light spots seen by the eye merely represents one of the light flashes seen at a different angular position, if some of the light flashes are omitted, owing to an interruption of the conductivity and intermittent luminosity of the tubes 18, and the screen 20 is viewed through only a single aperture such as an aperture 63, dark spaces will occur in the circle of light spots. The light spots will represent half cycles of the alternating current wave when the welding circuit is energized and the dark spaces will represent half cycles when the circuit is unenergized. For example, in the row of light spots 64 representing a condition where there are 900 interruptions of a welding current per minute and the system is energized for 4 half cycles and unenergized for 4 half cycles, the observer will see groups of 4 light spots 65 alternating with groups of 4 dark spaces 66. This appearance will indicate to the observer that the welding system has been energized for 4 half cycles and unenergized for 4 half cycles. It also indicates that the welding current is interrupted every eight half-cycles or 900 times per minute, since the supply source has a frequency of 60 cycles per second.

Owing to the persistence of vision, the groups of light spots 65 will appear around a large part of the circumference of the circle even though only a single aperture 63 is employed. However, in order to increase the intensity of the spots and the ease with which the observation may be made, a plurality of apertures 63, 63a, 63b, etc., evenly spaced around the circle is employed. The angular spacing between the apertures is so chosen that successive apertures will produce light spots superimposed on the spots produced by the previous apertures. The manner of determining spacing will be explained hereinafter.

In order that the proper spacing may be obtained, and the greatest brilliancy of light spots may be obtained, it is preferable to use a disk having a plurality of circles of apertures, each row corresponding to a different number of interruptions per minute. In the apparatus here shown in which the disk 21 is driven at 60 revolutions per minute, and a 60-cycle alternating current source is employed, the rows of apertures 61, 67, 64, 68 and 69 are used for making observations of the operation of the apparatus when adjusted for 1800, 1200, 900, 720, and 600 interruptions of the welding current per minute respectively. The circles contain 30, 20, 15, 12, and 10 apertures respectively. It will be observed in each case that the number of apertures is equal to the number of interruptions per minute divided by the speed of the disk in revolutions per minute. In each case the time required for an aperture to be rotated from its position at a given instant to the position of the adjacent aperture at the first instant is equal to the time interval between the interruptions in the welding current. Consequently the groups of light spots produced by any of the apertures in the row corresponding to the number of interruptions per minute at which the apparatus is being operated will be superimposed on the light spots produced by any of the other apertures in that row.

It will be obvious that, if desired, any of the apertures in a given row may be omitted, the only effect being a slight diminution of the brilliancy of the light spots. However, if the number of apertures is increased above that just outlined, the additional apertures will produce light spots in the areas which normally constitute dark spaces. In fact the circles having a greater number of apertures than the number shown will produce complete circles of light spots. For example, if the apparatus is adjusted as previously assumed to operate at 900 interruptions per minute the circle of apertures 64 will produce an indication of the number of cycles the welding current is flowing and the number of cycles the current is interrupted. However, the circles 61 and 67 having a greater number of apertures will produce complete circles of 120 light spots each. The circles having a smaller number of apertures than circle 64 will either produce similar indications with the brilliancy somewhat diminished or will produce circles in which the groups of light spots and dark spaces appear to move around the circle. The latter effect will occur as in the present case when the angular distance between the apertures is not a multiple of the angular distance between the apertures of circle 64 since each aperture will tend to produce series of light and dark spots independently of the other apertures and the persistence of vision is not great enough to carry the illusion of constant brilliancy of the light spots long enough for the disk to make a complete revolution when revolving at 60 R. P. M.

Although I have shown, for the sake of illustration, the appearance of the light spots when the welding circuit is energized for 4 half cycles and unenergized for 4 half cycles, it will be understood that indications may be obtained in a similar manner for any number of half cycles on and any number of half cycles off. It will also be understood that if the welding apparatus is adjusted so as to produce a number of interruptions per minute corresponding to one of the other circles of apertures shown in Figs. 7 and 8, an appearance for the proper circle will be obtained similar to that shown for circle 64.

Although I have shown, for the sake of illustration, an arrangement in which the disk 21 is provided with apertures through which the flashing light source is viewed, it will be understood that my invention is not limited to this exact arrangement. For example, the disk may be provided instead with painted spots or sectors which are viewed by the light of the flashing light source.

In the arrangement of Fig. 1 the inherent characteristic of the discharge tubes 18 to produce light flashes of relatively short duration during their conducting periods, which correspond to the periods during which the welding circuit is energized, is made use of to produce the light flashes required for the visual effect which gives the desired indication. Each of the tubes 18 becomes luminous only once during the cycle but the tubes are asymmetrically connected so that their light flashes occur alternately and a light flash is obtained during each half cycle. If desired, the apparatus may be so arranged that the light flashes produced by only one of the tubes 18 are viewed. In this case each light spot would correspond to a cycle during which the welding circuit was energized and it would obviously not be possible to differentiate between the half-cycles and whole cycles.

Although I find it desirable in many applications to make use of the light flashes produced by the discharge tubes which already form a part of the welding system, I may also utilize separate means for producing light flashes. For example, in the arrangement shown in Fig. 2, a source of light which may be arranged to produce light flashes of short duration such as a neon tube 80 is enclosed in a light-tight box 81 provided with a translucent screen 82. The neon tube 80 is connected in series with a resistor 83 across the resistor 34, the voltage across which controls the discharge tubes 18, so that the neon tube 80 is energized whenever the discharge tubes 18 are rendered conducting. A condenser 84 is connected in parallel with the neon tube 80. The condenser 84 and the resistor 83 serve to cause the voltage acting on the neon tube 80 to build up gradually and to be discharged rapidly through the neon tube 80 so as to produce brilliant light flashes of very short duration once during each half-cycle. It will be obvious that the appearance of the light spots and dark spaces obtained by viewing the translucent screen 82 through the apertures of disk 21 will be the same as that described in connection with the embodiment of Fig. 1.

If it is desired to have the neon tube 80 produce a flash only once each cycle during energization of the welding circuit instead of once each half-cycle, a rectifier 83' of any suitable type, such as, for example, a copper oxide rectifier, may be connected in series with the neon tube 80 by opening the switch 84', thereby cutting off alternate half cycles. When the neon tube 80 is arranged in this manner, it is obviously unnecessary to provide means for causing it to luminesce only during the voltage peaks since the alternate half-cycles when the current is cut off by the rectifier 83', provide ample spacing between light spots to enable distinguishing them as separate spots. This arrangement may be desirable when the welding apparatus is so arranged that only interrupting rates can be obtained which correspond to welding periods and intervals between initiations of the welding current comprising whole numbers of cycles.

Figure 9:
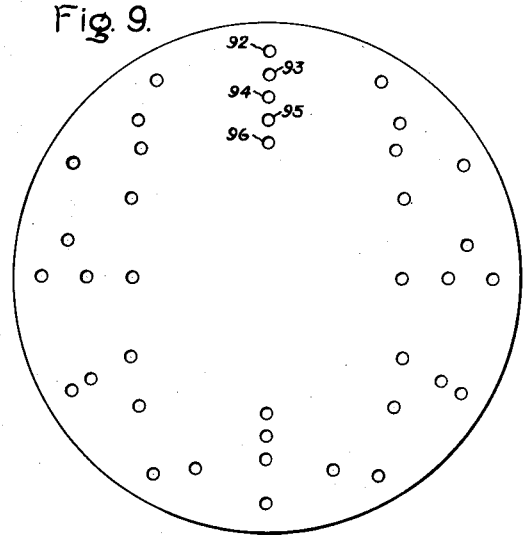
Fig. 9 is a diagram illustrating a modified arrangement of apertures in a rotating disk.

When my timing apparatus is to be used with welders which are to operate at a wide variety of different interrupting rates, it may be desirable to provide the motor 22 with change gears, pole changing arrangements or by some other suitable method to permit rotating the disk 21 at different speeds, since it may be difficult to adapt the device to certain combinations of interrupting rates without changing the speed of the disk or permitting the light spots to rotate around the circle instead of remaining stationary. It is not essential, however, to have the light spots remain stationary to obtain satisfactory readings. I have found, for example, that in connection with welding apparatus adjustable for interrupting rates corresponding to whole-cycle intervals, readings may be taken at a relatively large number of different interrupting rates with a disk having relatively few rows of apertures by rotating a disk arranged as shown in Fig. 9 at 50 revolutions per minute where a 60-cycle-per-second power supply is used. The disk shown in Fig. 9 is provided with rows of apertures 92, 93, 94, 95, and 96 containing 12, 9, 8, 6, and 4 apertures respectively. The outer four rows 92 to 95 permit easily making readings with any interrupting rate from 1800 down to 300 interruptions per minute, inclusive, which corresponds to any interval between initiation of the welding current from 2 to 12 cycles, inclusive. The inner row 96 is used for making readings with an interrupting rate of 200 interruptions per minute primarily in connection with spot welding, where as the higher interrupting rates are used for line welding.

As already explained, the light spots will remain stationary if the number of apertures in the row being viewed is equal to the quotient of the number of interruptions per minute of the welding current divided by the speed of the disk in revolutions per minute or if the number of apertures is any whole number which is a factor of said quotient. Or expressed in another way, the light spots will appear stationary if the time required for the disk to make one revolution is equal to or a multiple of the product of the number of apertures in the row being viewed and the time interval between successive initiations of the welding current. With 60-cycle current supply, a speed of 50 revolutions per minute corresponds to one revolution in 72 cycles. Consequently, the light spots will appear stationary in rows 92, 93, 95, and 96 with 2-cycle intervals between successive initiations of the welding current; in rows 92, 95, and 96 with 3-cycle intervals; in rows 95 and 96 with 4-cycle intervals; in rows 92, 95 and 96 with 6-cycle intervals; in row 93 with 8-cycle intervals; in rows 94 and 96 with 9-cycle intervals; and in row 95 with 12-cycle intervals.

However, since the interrupting rates corresponding to the intervals of 5, 7, 10, and 11 cycles are each close to one of the interrupting rates at which the spots remain stationary, the spots will tend to move slowly for these other interrupting rates, thereby permitting readings to be made readily at these interrupting rates also. For instance, at an interrupting rate corresponding to a 5-cycle interval, the light spots will appear to travel backward slowly in row 92 and forward slowly in row 93. Likewise with a 7-cycle interval, the light spots will appear to move forward slowly in row 92 and backward slowly in row 93. With 10-cycle and 11-cycle intervals, the spots will appear to move forward in row 94 and backward in row 95, moving in row 94 more slowly with a 10-cycle interval and in row 95 more slowly with an 11-cycle interval.

Figure 3:
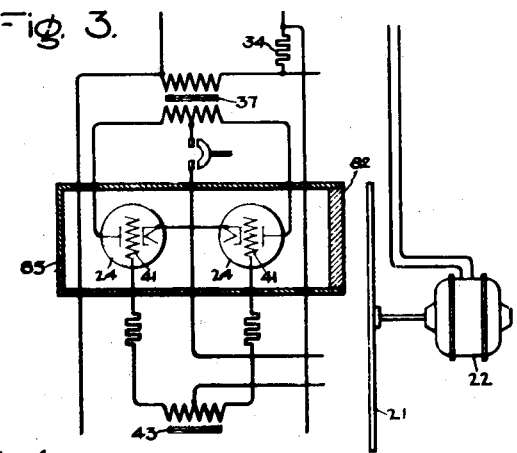
Fig. 3 represents in part a modification of Fig. 1 in which a different set of discharge tubes is utilized as the source of light.

In the arrangement of Fig. 1 the luminous properties of discharge tubes 18 are made use of. However, it will be understood that the apparatus may also be arranged to utilize the luminous properties of discharge tubes 24 as illustrated in Fig. 3. In the arrangement of Fig. 3 discharge tubes 24 are enclosed in a light-tight box 85 and the light flashes are viewed as before through the apertures of rotating disk 21. Since the welding current between the electrodes 13 is controlled by the conductivity of discharge tubes 24 and the discharge tubes 24 become luminous when conducting, the arrangement of Fig. 3 will operate in a manner corresponding to that already described in connection with Fig. 1.

Figure 2:
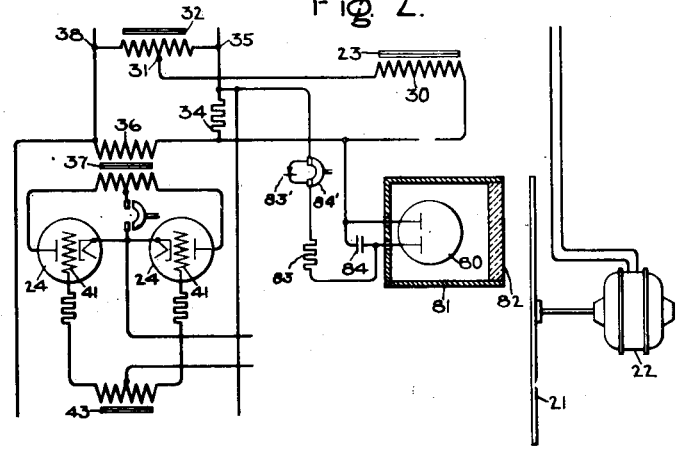
Fig. 2 represents in part a modification of the circuit of Fig. 1 in which a separate lamp is utilized for producing light flashes.
Figure 4:
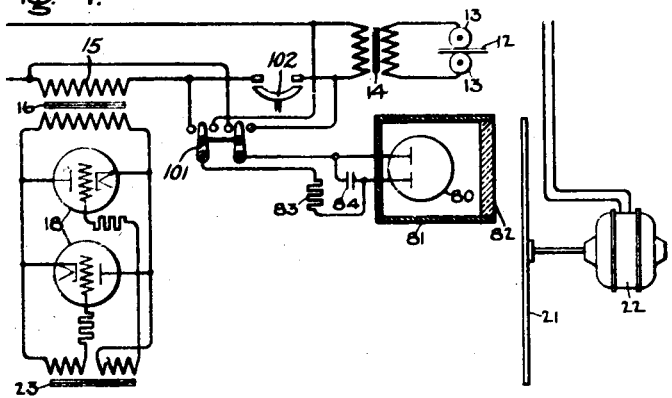
Fig. 4 represents in part a variation of the arrangement of Fig. 2 in which the lamp furnishing the light flashes is energized from a different part of the circuit of the welding system.

Fig. 4 represents an arrangement utilizing an independent source of light flashes similar to the arrangement of Fig. 2 except that the light source is connected directly to the circuit supplying the welding transformer 14. Obviously the neon tube 80 in Fig. 4 is energized whenever the welding circuit is energized, and the operation will be similar to that previously described. Although I have described apparatus in which a flashing light source is energized while a welding circuit is energized so as to produce light spots representing the periods of energization and dark spaces representing the periods when the circuit is not energized, it will be understood that I am not limited to this arrangement. My invention obviously includes arranging the apparatus so that the light spots will be produced when the welding circuit is not energized instead of when it is energized. For instance, if the neon tube 80 is connected to points in the welding circuit between which a voltage exists only when the welding electrodes 13 are not conducting appreciable current, or if the tube 80 is controlled by a suitably arranged relay, the light spots 65 of Fig. 8 may be produced while the welding circuit is not energized and the spaces 66 may be left dark while the circuit is energized. This operation would result, for example, if the neon tube 80 were connected across the windings 36 or 15 instead of as shown in Figs. 2 or 4. If desired, a double-pole double-throw switch 101 as in Fig. 4 may be provided to permit connecting the neon tube 80 across an element of the circuit such as winding 15 in which there is appreciable voltage only when the welding circuit is not energized, the switch 102 being closed while the apparatus is in operation.

Any other desired means for causing the neon tube 80 to produce brilliant flashes of light once during each half-cycle or cycle may also be employed. For example, in the arrangement of Fig. 5 the neon tube 80 is connected to the secondary winding 86 of a specially constructed transformer 87 having a magnetic bridge 88 containing air gap 89.

The dimensions of the magnetic circuit of the transformer 87 are such that the leg 90 on which the secondary winding 86 is wound is relatively highly magnetized and saturates readily. The primary winding 91 of the transformer 87 is connected across the resistor 34 to correspond to the arrangement of Fig. 2 or across the primary winding of the transformer 14 to correspond to the arrangement of Fig. 4. When the voltage wave impressed on winding 91 rises, the flux in the leg 90 of the transformer 87 increases rapidly. At a predetermined voltage, the leg 90 becomes saturated so that the flux flowing across the air gap 89 increases. Relatively little further increase in flux occurs in the leg 90 and when the voltage applied to winding 91 falls again below the value at which leg 90 is saturated the flux of leg 90 drops abruptly. As a result of the fact that the flux in leg 90 rises and falls abruptly and that there are relatively long intervals between the variations in flux, the voltage induced in winding 86 and applied to neon tube 80 consists of peaks of short duration rising and falling relatively rapidly as shown in Fig. 6. Consequently brilliant flashes with short duration are emitted by the neon tube 80.

Figure 10:
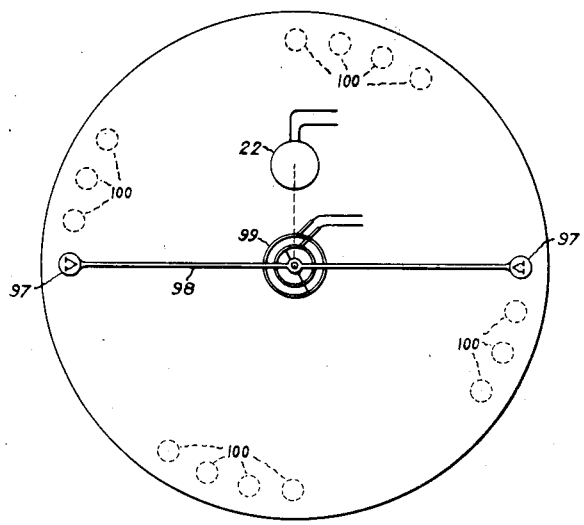
Fig. 10 is a diagram illustrating in part a modification employing a revolving light source.

Although for mechanical reasons I ordinarily prefer to employ a stationary light source cooperating with a movable optical device such as a perforated or painted disk, my invention is obviously not limited to such arrangements and also includes, for example, the use of a movable light source as shown in Fig. 10. In this embodiment of my invention, one or more light sources 97 such as neon tubes, for example, are mounted on a revolving member 98 driven by a motor 22. The neon tubes 97 are connected through slip-rings 99 across either the resistor 34 or across the primary winding of the transformer 14 in place of the neon tube 80 shown in Figs. 2 and 4. The neon tubes 97 are viewed directly and give the appearance of groups of light spots 100 alternating with dark spaces analogous to the appearance of Fig. 3.

In accordance with the provisions of the patent statutes, I have described the principle of operation of my invention together with the apparatus which is now considered to represent the best embodiment thereof, but I desire to have it understood that the apparatus shown and described is only illustrative and that the invention may be carried out by other arrangements.

What I claim as new and desire to secure by Letters Patent of the United States is:

1. In combination with an intermittently energized alternating current welding system, means for indicating the lengths of the energized and deenergized periods comprising a lamp energized by said welding system, a rotatable disc illuminated on one side by said lamp and means for rotating said disc at such a speed that the ratio of the frequency of the alternating current circuit energizing said welding system to said speed forms a whole number, said lamp luminescing during the peaks of the voltage wave of said alternating current welding system, said rotatable disc having therein evenly spaced on a circle coaxial with the axis of rotation of said disc, holes equaling in number the number of interruptions per minute of said welding system divided by the number of revolutions per minute of said rotatable disc, said lamp viewed through said disc producing a plurality of series of light spots alternating with dark spaces having relative lengths corresponding to the relative on and off periods of said welding system.

2. In combination with an alternating current system, alternately energized and deenergized at a uniform rate, means for indicating the lengths of the energized and deenergized periods comprising a light emitting device electrically connected to said system and becoming luminous intermittently at a rate determined by the frequency of said system, a rotatable element optically cooperating with said light emitting device and means for rotating said element at such a speed that the ratio of the number of interruptions per minute of said alternating current system to said speed in revolutions per minute forms a whole number, said rotating element having means for producing light images thereon whenever said light emitting device becomes luminous, thereby producing series of light spots alternating with dark spaces, the relative lengths of said light and dark spaces indicating the relative lengths of the energized and deenergized periods of said alternating current system.

3. In combination with an alternating current system alternately energized and deenergized at a uniform rate, means for indicating the lengths of the energized and deenergized periods comprising a light emitting device associated with said system and becoming luminous intermittently at a uniform rate during said energized periods, a rotatable element optically cooperating with said light emitting device and means for rotating said element at a uniform rate of speed, said rotating element having means thereon for producing light images whenever said light emitting device becomes luminous thereby producing series of light spots, alternating with dark spaces, the relative lengths of said light and dark spaces indicating the relative lengths of the energized and deenergized periods of said alternating current system.

4. Apparatus for indicating the duration of regularly recurring operations comprising a light emitting device, means for causing said device to become luminous intermittently at a uniform rate during each of said operations, a movable element optically cooperating with said light emitting device and means for producing motion of said element at a uniform rate of speed; said movable element having means thereon for producing light images when said light emitting device becomes luminous thereby producing series of light spots appearing in successive positions to form light spaces, and leaving dark spaces alternating with said light spaces, the relative lengths of said light and dark spaces indicating the relative time duration of said operations and the intervals therebetween.

5. In combination with an alternating current system alternately energized and deenergized at a uniform rate, means for indicating the lengths of the energized and deenergized periods comprising a light emitting device associated with said system and becoming luminous intermittently at a uniform rate during said energized periods, means for causing light spots produced by said light emitting device to appear in successively different positions, thereby producing series of light spots alternating with dark spaces, the number of light spots in said series indicating the length of the energized periods of said alternating current system.

6. Apparatus for indicating the duration of regularly recurring operations comprising a light emitting device, means for causing said device to become luminous intermittently at a uniform rate during said operation, means for causing said device to appear to assume successively different positions, thereby producing series of light spots alternating with dark spaces, the number of light spots in said series indicating the time duration of said operations.

7. Apparatus for indicating the duration of regularly recurring operations comprising, a light emitting device, means for causing said device to become luminous intermittently at a uniform rate during said operation, means for moving said device to successively different positions thereby producing series of light spots alternating with dark spaces, the number of light spots in said series indicating the time duration of said operations.

8. Apparatus for indicating the time intervals between regularly recurring operations comprising a light emitting device, means for causing said device to become luminous intermittently at a uniform rate during said operation, means for causing light spots produced by said device to appear in successively different positions, thereby producing alternately light and dark spaces, the length of one of which provides an indication of the time intervals between said operations.

9. A time indicator for apparatus having a different operating condition during alternate time periods, comprising a light emitting device, means for causing said device to become luminous intermittently at a uniform rate during said alternate periods, means for causing said device to appear to assume successively different positions, thereby producing alternately light and dark spaces the lengths of which provide indications of the lengths of said time periods.

HAROLD W. LORD.